United States Patent
März

(10) Patent No.: US 6,457,424 B1
(45) Date of Patent: Oct. 1, 2002

(54) CREMATION SYSTEM

(75) Inventor: Herbert März, Remseck (DE)

(73) Assignee: Messer Griesheim GmbH, Frankfurt (DE)

( * ) Notice: Subject to any disclaimer, the term of this patent is extended or adjusted under 35 U.S.C. 154(b) by 0 days.

(21) Appl. No.: 09/402,159

(22) PCT Filed: Oct. 31, 1997

(86) PCT No.: PCT/EP97/06027

§ 371 (c)(1),
(2), (4) Date: Mar. 16, 2000

(87) PCT Pub. No.: WO98/27387

PCT Pub. Date: Jun. 25, 1998

(30) Foreign Application Priority Data

Dec. 19, 1996 (DE) .......... 196 52 967

(51) Int. Cl.⁷ .............. F23G 1/00; F23G 7/06; F23B 5/00
(52) U.S. Cl. .......... 110/194; 110/204; 110/241; 110/211; 110/303
(58) Field of Search .............. 110/214, 194, 110/203, 208, 204, 240, 241, 210, 211, 297, 303

(56) References Cited

U.S. PATENT DOCUMENTS

| 1,156,398 A | * | 10/1915 | Fischer | 110/3 |
| 3,307,507 A | * | 3/1967 | Boyd et al. | 110/8 |
| 3,446,163 A | | 5/1969 | Sharpe | |
| 3,682,115 A | * | 8/1972 | Rodgers | 110/8 C |
| 4,000,705 A | * | 1/1977 | Raber | 110/3 |
| 4,627,365 A | * | 12/1986 | Tseng | 110/240 |
| 4,688,494 A | * | 8/1987 | Domnitch | 110/240 |
| 4,739,713 A | * | 4/1988 | Vier et al. | 110/263 |
| 4,875,420 A | * | 10/1989 | Hay et al. | 110/215 |
| 4,913,097 A | * | 4/1990 | Derksen et al. | 122/4 D |
| 5,237,938 A | * | 8/1993 | Fujimori et al. | 110/240 |
| 5,241,916 A | * | 9/1993 | Martin | 110/348 |
| 5,309,850 A | * | 5/1994 | Downs et al. | 110/235 |
| 5,339,752 A | * | 8/1994 | Lewis | 110/194 |
| 5,606,923 A | * | 3/1997 | Fujimora | 110/211 |
| 5,685,243 A | * | 11/1997 | Gohara et al. | 110/345 |
| 5,727,481 A | * | 3/1998 | Voorhees | 110/237 |
| 5,799,597 A | * | 9/1998 | Kaehr | 110/346 |
| 5,826,521 A | * | 10/1998 | Schumann et al. | 110/345 |

FOREIGN PATENT DOCUMENTS

| DE | 25 17 200 | 10/1976 |
| DE | 3838894 A1 | 5/1990 |
| DE | 396 718 B | 11/1993 |
| DE | 9407906.4 | 9/1994 |
| DE | 4313102 A1 | 10/1994 |
| GB | 2180630 | 4/1987 |

* cited by examiner

Primary Examiner—Denise L. Esquivel
Assistant Examiner—K. B. Rinehart
(74) Attorney, Agent, or Firm—Jones, Tullar & Cooper, P.C.

(57) ABSTRACT

The present invention concerns a cremation system for corpses located in coffins. The system comprises a combustion chamber in whose wall is disposed at least one burner to which auxiliary energy can be supplied, a line for discharging flue gas from the combustion chamber, further lines for recirculating some of the flue gas branching off from the discharging line, and a mixer for mixing oxygen, up to at lest 90% pure with some of the recirculating flue gas. The mixture is then fed to the burners. The system is designed to be a mobile unit with two interconnected modules.

4 Claims, 2 Drawing Sheets

CREMATION SYSTEM

FIELD OF THE INVENTION

The present invention relates to a cremating device for corpses in coffins, the cremation device has a combustion chamber, in whose wall at least one burner is arranged, and which can be provided with auxiliary energy, and a line for removing the flue gas being formed in the course of combustion, from this line a further line for recirculating a portion of the flue gas branches off, and wherein oxygen, which is to at least 90% pure, is admixed with a portion of the diverted flue gas in a mixer. The synthetic mixture consisting of recirculated flue gas and pure oxygen is supplied to the burners.

PRIOR ART

Such a cremating device is described in published German Patent Application 196 28 741.3.

SUMMARY OF THE INVENTION

It is the object of the present invention to design the entire process (cremation, flue gas purification) as a compact unit in such a way that its flexible employment at any conceivable location is possible, while taking into consideration spacesaving, energy-saving and environmental aspects.

This object is attained in accordance with the present invention by designing a mobile cremating device embodied as a container.

An exemplary embodiment of the present invention and of its advantageous further developments will be described in greater detail by reference to FIGS. 1 and 2.

DESCRIPTION OF THE PREFERRED EMBODIMENT

Figure 1:
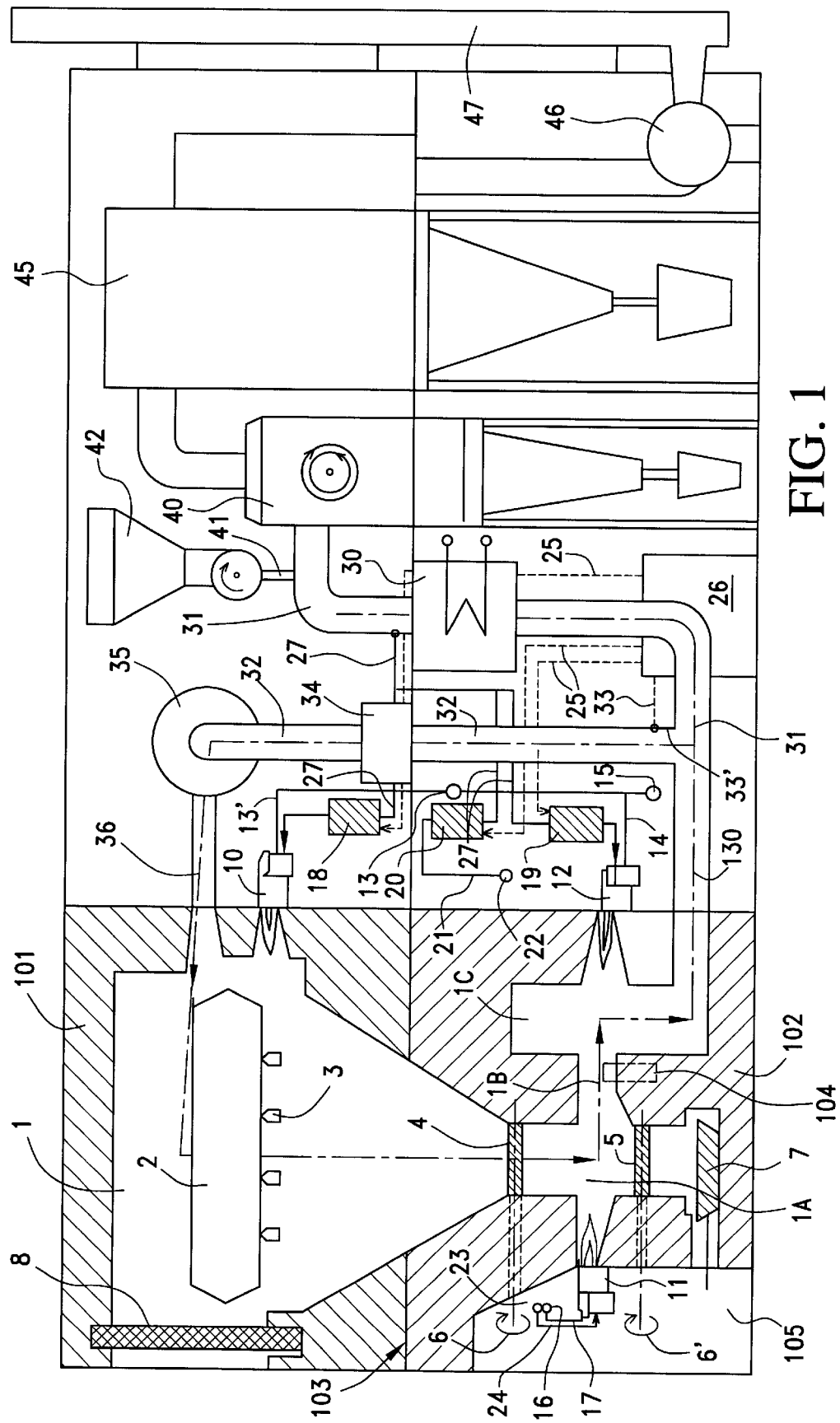
FIG. 1 represents an exemplary embodiment of the present invention.

FIG. 1 represents a cremating device put together from an upper module 101 and a lower module 102. The modules rest against each other along a horizontal separating plane 103 and, when put together, constitute the cremating device. The means for connecting the two modules with each other, as well as the means for transporting, wherein a single container can be transported by a low boy trailer, for example, are obvious to one skilled in the art and are therefore not explained in detail in the present connection. The size of the container is, for example 9 m×3.6 m×2.5 m. The module 101 constitutes the upper unit, the module 102 constitutes the lower unit.

Besides the cremation oven, the container modules placed one on top of the other house the synair mixer system, draft units, heat exchanger, electric and regulating devices, flue gas measuring devices, as well as a flue gas scrubbing installation. These components have been installed in the free spaces of the two container modules.

Figure 2:
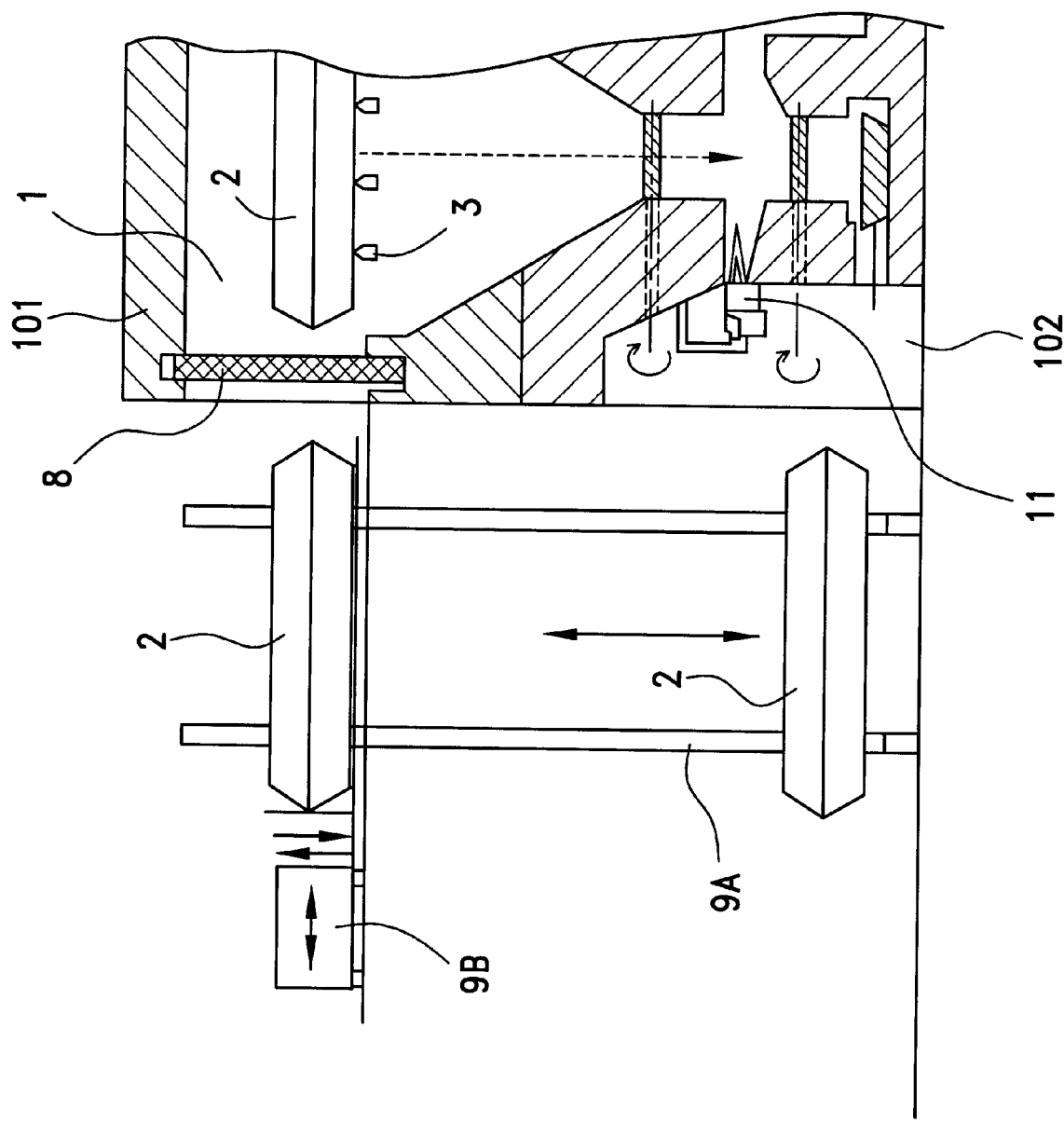
FIG. 2 shows the cooperation between a lifting device, a displacement device and the cremating device for loading the latter.

FIG. 1 shows a cremation oven 1. It is designed as a so-called double-deck oven. It is embodied to be partially in the upper module 101, partially in the lower module 102, i.e. to be in two parts. This oven differs from a stationary double-deck oven by its container module separating point, i.e. it is made in two halves. A coffin 2 is placed on supports 3. The insertion of the coffin is provided by means of a displacement device through a door 8 of the cremation oven 1, which is open at that time. Prior to this, the coffin 2 is transported with the aid of a lifting device 9A (see FIG. 2) to the displacement height of the door 8. Two burners 10 and 12 terminate in the wall of the cremation oven, whose auxiliary energy (for example natural gas) is supplied from a connector 13 through the lines 13', 14. The burner 11, which is supplied with auxiliary energy through the connectors 13, 15, 16 and the line 17, terminates on the left side. The mixture of flue gas, cooled in a heat exchanger 30, and oxygen, supplied through lines 25 (in dashed lines), is formed in the associated mixers 18 and 19 and delivered to the burners. The mixture supplied to the burners is therefore constituted of recirculated flue gas and support energy ("synair").

As a rule, the oxygen source is a liquid oxygen tank with a vaporization unit, which is placed outside of-the mobile installation and connected by means of connecting lines to the connector location of the $O_2$-regulating station 26 of the installation.

A mixture of recirculated flue gas mixed with oxygen is supplied to the burners 10, 11, 12 through a mixer 20 to the burner 11, as well as to the connectors 22, 23, located outside of the drawing plane, and the line 24.

The line 31, from which the line 32 branches off, is the flue gas removal line of the cremation oven 1.

The main flue gas mixer 35 of the synthetic combustion cycle is charged with the flue gases from the cremation oven 1, whose temperature is approximately 800° C., through the line 32. Oxygen is added through the line 33 at the point 33'. Flue gas and oxygen are mixed in the mixer 35 and flow over the line 36 into the cremation oven 1.

A CO sensor 104 is installed in the area 1B, i.e. before the afterburning of the flue gas.

The $O_2$ concentration in the synair mixture in the mixer 35 is regulated by means of this CO sensor. Moreover, the $O_2$ concentration in the recirculated flue gas is redundantly measured parallel with the CO sensor.

Since at the start of the combustion process the available amount of carbon to be burned is greater than the amount of air supplied in conventional cremating installations, an imbalance between carbon and oxygen is unavoidably created, i.e. with the lack of oxygen, which is the overwhelming case in conventional combustion, CO is unavoidable formed, which lies above permissible threshold values. It is therefore necessary to burn it later in the chamber 1C.

When burning the synthetic air (synair), it is possible by means of the CO measurement to set the concentration of oxygen arbitrarily up to the oxidation balance between C and $O_2$. This is not possible with an $O_2$ concentration of maximally 21% when burning under atmospheric conditions.

The amount of flue gas which must be unavoidably removed from the combustion cycle is regulated by means of a pressure difference measurement device, not represented in the drawings, via a regulating flap 48. Since the cremation oven is in principle operated at underpressure, the regulating flap 48 opens with increasing pressure and closes when the underpressure falls below the permissible level.

Initially, the amount of flue gas to be removed is cooled to approximately 120 to 140° C. in a heat exchanger before it reaches the flue gas scrubbing installation through the line 31. The flue gas, cooled to approximately 120 to 140°, needed for the burners 10, 11, 12 is removed out of the line 31 through a tap line 27. The flue gas is further cooled by the admixing of oxygen and therefore makes the employment of conventional industrial burners possible.

The amount of flue gas heat emitted through the heat exchanger 30 is delivered to external users. This is a relatively-small amount of energy.

Different from conventional methods, the flue gases which move in the cycle at approximately 800° C., are cooled to approximately 700 to 750° C. after being mixed with oxygen and are returned through the line 36 to the cremation oven 1. Thus the amount of heat is released where it traditionally belongs, namely in the cremation oven 1. This is thermal recycling. The switch-on cycles of the burners 10 and 11 are considerably reduced because of this process, which will become noticeable in turn in the form of an energy reduction, and therefore a $CO_2$ reduction. The switch-on cycle of the burner 12 depends on the CO concentration in the flue gas, which is measured by means of the CO sensor, and is only used as a safety brake.

By these means, combustion under the exclusion of atmospheric conditions (78% of the nitrogen carried along are omitted), and by the reduction of the natural gas auxiliary energy, it is possible to reduce the flue gas, which up to now under conventional conditions had been removed up to 100%, by up to 90%, i.e. under the described conditions it is necessary to release only approximately 10% of the volume of the flue gas flow into the environment.

Only on this basis is it possible to integrate such a small flue gas scrubbing installation into the described container modules.

Under atmospheric combustion conditions, conventional cremation ovens produce a volume of the flue gas flow of 3,000 to 4,000 $Nm^3/h$ per oven.

In contrast to this, under cycle conditions the same cremation oven 1 only produces approximately 300 to 400 $Nm^3$ of flue gas per hour and per cremation oven. A further advantage of the process technology lies in the cleaning of the pollutants themselves.

The drastic reduction of the volume of the flue gas flow, along with the simultaneous concentration of the pollutants, results in a considerable reduction of the remaining pollutants reaching the outside, because with modern flue gas scrubbing installations the amount of remaining pollutants is directly proportional to the amount of flue gas.

The amount of flue gas which unavoidably must escape from the combustion cycle is conducted downstream of the heat exchanger 30 through the continuing flue gas line 31 to a so-called "flue dust flow" reactor 40, to which an adsorption agent, such as "Sorbalit"®, a mixture of calcium hydride and pulverized open-hearth coke, is delivered via a nozzle 41 from a reservoir 42. The pulverulent adsorption agent delivered through the nozzle 41 is then cleaned again in the adjoining textile filter 45 before the scrubbed flue gas, conveyed by the draft unit 46, escapes through the stack 47.

As already mentioned, in contrast to known combustion devices the amount of oxygen required for the combustion of the auxiliary energy (for example natural gas) is made available by the supply of technically generated oxygen, which is taken off at the $O_2$ regulation station 26 at a purity of at least 90%.

The above described direct supply of synthetic air, i.e. of the described mixture of recirculated flue gas and pure oxygen, directly to the combustion chamber 1 through the connecting route 36 is used to satisfy the considerable oxygen requirement being created by the combustion of the wood of the coffin 2, in particular in the beginning phase of the combustion process and which normally, i.e. during combustion with air added, cannot be satisfied by the limited proportion of oxygen in the air. With conventional combustion installations this leads to a very high CO (carbon monoxide) proportion in the starting phase, since with natural air the amount of oxygen available is limited by the $O_2$ portion of the air, which is 21%. The amount of CO being generated is reduced with the present invention by the direct supply of "synair" without burning auxiliary energy. CO formation is suppressed by regulating the oxygen and under certain circumstances can be lowered down to the detection limit. In this phase the required energy for combustion is made available by the carbon portion of the wooden coffin, so that therefore at this place and in this phase an energy supply from the outside is no longer required. This reduces, on the one hand, the provision (amount) of auxiliary energy (natural gas) to be supplied through the burners and, on the other hand, therefore lowers the proportion of carbon dioxide in the total of the flue gas to be removed.

The reason that in the course of this process not only pure oxygen is made available, but that the latter is admixed with the recirculating flue gas, lies in that otherwise the combustion temperature in the combustion chamber would become inadmissibly high. The recirculated flue gas, predominantly consisting $CO_2$, takes on the cooling function, as well as the heat transport function of the substituted nitrogen.

The flue gas recirculation through the line 27 to the mixers 18, 19, 20 to the burners is performed with the admixing of oxygen in cooled form (also see the process: downstream of the heat exchanger 30 the flue gas is cooled to 120 to 140° and is then partially removed through the line 27).

In contrast thereto the flue gas, which is at a temperature of approximately 800° C. and is supplied through the line 32 to the mixer 30, is only cooled down to approximately 700 to 750° C. by the admixture of oxygen. The result of this is that the additionally required heating of the combustion chamber by supplying auxiliary energy to the burners 10, 11, 12 is correspondingly reduced. It is sufficient to operate the burner(s) only at intervals, namely at correspondingly greater intervals between switched-on periods. It is therefore possible to turn the burners off temporarily, namely when— at the start of the combustion process—the coffin 2 itself is burning. Thus, maintaining a high temperature by recirculating the uncooled flue gases, as well as making oxygen simultaneously available, make it possible to maintain the combustion process without auxiliary energy. Considerable amounts of energy can be saved by this, not only with respect to the auxiliary energy, but also with respect to oxygen. This in turn causes a reduction of the carbon dioxide created, which is environmentally disturbing because of the "greenhouse effect".

All the processes of course require a regulation as a function of the progress of the combustion process which, as already mentioned, fluctuates greatly. This is done, to the extent it has not been described above, by means of known regulating steps, so that in the present connection it is not necessary to address this further A further advantage of the process sequence proposed here results in connection with-the size. While with conventional combustion the volume of the flue gas flow is approximately 2,200 to 2,500 $Nm^3/h$ of flue gas, it can be designed under the cycle conditions shown to about ¼, i.e. to approximately 400 to 600 $Nm^3/h$. This makes possible a reduction and therefore also the construction of the described transportable container unit. Container units, such as disclosed above, can also be brought directly into existing building units and permanently installed there. Moreover, the length of combustion is considerably reduced by the method in accordance with the present invention. While with conventional cremation the combustion in the starting phase is more of a low temperature carbonization process (CO formation), with the present invention the combustion process is considerably accelerated by the mentioned oxygen supply. This is of great importance in view of the increasing number of cremations.

A further advantage of the shown process sequence lies in the reduced amount of required operating means. The conventionally required catalytic nitrogen removal, namely the addition of adsorption agents, such as "Sorbalit"®, can be considerably reduced. Since combustion takes place without air, and therefore the creation of nitrogen oxide falls toward zero, the scrubbing of the flue gases in the reactor 40 is essentially only used for removing the dibenzodioxins and dibenzofuranes being generated when burning the coffin and the corpse, as well as poisonous matter being generated by burning heavy metals, for example mercury (part of amalgam fillings), etc.

What is claimed is:

1. A cremating device for corpses in coffins, comprising:

means defining a combustion chamber;

at least one burner mounted to said means defining said combustion chamber;

means providing said at least one burner with auxiliary energy;

a flue gas removing line connected to said combustion chamber for removing flue gas from said combustion chamber after combustion;

a recirculating line connected to said flue gas removing line; and mixing means connected to said recirculating line for mixing a portion of flue gas removed by said flue gas removing fine with oxygen which is at least 90% pure, and for delivering the mixture to said at least one burner, wherein said means defining a combustion chamber comprises two modules which can be separated from each other producing thereby a cremation installation in the form of a mobile container unit, and wherein said mixing means includes a mixer associated with each burner, which sets the oxygen concentration at the associated burner of the mixer independently of the other mixers.

2. The cremating device as defined in claim 1, wherein said modules define a horizontal separating plane when joined together, said separating plane being located at approximately the center of said joined modules.

3. The cremating device as defined in claim 2, wherein one of said modules includes a mixer of said mixing means.

4. The cremating device as defined in claim 1, wherein said combustion chamber comprises two halves, each half in one of said two modules.

* * * * *